United States Patent [19]
Yuyama et al.

[11] Patent Number: 6,112,882
[45] Date of Patent: Sep. 5, 2000

[54] AMPULE DELIVERY DEVICE

[75] Inventors: Shoji Yuyama; Naoki Koike; Yosuke Ishimura, all of Toyonaka, Japan

[73] Assignee: Kabushiki Kaisha Yuyama Seisakusho, Osaka, Japan

[21] Appl. No.: 09/035,760

[22] Filed: Mar. 6, 1998

[30] Foreign Application Priority Data

Mar. 25, 1997 [JP] Japan ................................. 9-071530

[51] Int. Cl.$^7$ ................................................ B65G 29/00
[52] U.S. Cl. .................................... 198/468.8; 198/418.6
[58] Field of Search .............................. 198/468.8, 418.6

[56] References Cited

U.S. PATENT DOCUMENTS

| | | | |
|---|---|---|---|
| 3,894,631 | 7/1975 | Rose et al. | 198/418.6 |
| 3,964,233 | 6/1976 | Thomas | 198/418.6 |
| 4,418,814 | 12/1983 | Rose | 198/418.6 |
| 4,603,772 | 8/1986 | Tomosue | 198/468.8 |

*Primary Examiner*—Christopher P. Ellis
*Assistant Examiner*—Joe Dillon, Jr.
*Attorney, Agent, or Firm*—Wenderoth, Lind & Ponack, L.L.P.

[57] ABSTRACT

An ampule delivery device which can efficiently deliver ampules from an ampule collecting device or a conveyor into a bucket in a short period of time without breaking ampules. The ampule delivery device includes a container having a bottom plate that is pivotable about a shaft between an open and a closed position, a locking member for locking the bottom plate in its closed position, and an elevator for moving the container up and down together with the locking member. An ampule collecting device is inserted into the container after emptying the container to prevent any ampules from being broken by the collecting device.

9 Claims, 4 Drawing Sheets

AMPULE DELIVERY DEVICE

BACKGROUND OF THE INVENTION

This invention relates to an ampule delivery device having a vertically movable ampule collector for collecting ampules supplied from an ampule feed unit comprising a plurality of ampule feeders and delivering them into buckets so as not to break any ampules.

Ampule collecting devices used in hospitals to collect injection drug ampules prescribed for each patient are disclosed in unexamined Japanese patent publications 2-28416 and 2-28417, which are both filed by the applicant of this invention. In these devices, ampules that are different in size (extra large LL, large L, medium M, small S) and contain different kinds of injection drugs are taken out of a cassette housing for each patient, placed by sizes on a plurality of vertically arranged horizontal conveyors, transferred onto a vertical conveyor at the end of the delivery ends of the horizontal conveyors by a transfer means, and discharged by a setting means when they pass the highest point of the vertical conveyor.

The transfer means temporarily stocks ampules received from the horizontal conveyors, and pushes up the ampules one by one with a pusher onto the vertical conveyor. These ampule collecting devices can prepare ampules for a plurality of patients in a short time with high efficiency because as soon as ampules for one patient are transferred onto the vertical conveyor, i.e. well before these ampules are discharged by the setting means, ampules for the next patient are selected and put on the conveyors.

These ampule collecting devices can transfer ampules for a plurality of patients efficiently in a sufficiently short time. However, if the conveyor speed and the ampule push-up speed are increased in an attempt to further shorten the ampule preparation time, ampules may be broken by the pusher. In order to prevent breakage of ampules, the ampules have to be pushed up at a relatively slow speed.

Further, in this arrangement, in order to prevent breakage of ampules, ampules are tipped sideways one by one when transferred onto the vertical conveyor. Thus, ampules collected for each patient cannot be transferred onto the vertical conveyor at one time, so that the larger the number of ampules for one patient, the longer it takes to collect such ampules.

An ampule collecting device which is free of this problem would be one in which ampule feeders for discharging ampules one by one from ampule containers accommodating ampules in a disorderly manner are arranged cylindrically and stacked one upon another, and which further includes an ampule collecting container vertically movably provided along the ampule feeders. The ampule collecting container is moved up or down to the level of any ampule feeder to collect ampules.

With ampules placed therein, the ampule collecting container is lowered and its bottom is opened to empty ampules therein into a bucket. However, if the container is lowered until its bottom touches the bottom of a bucket, any ampules already in the bucket may be broken by the bottom of the container.

Thus, it is necessary to stop the container while its bottom is still at a level which is higher than the top edge of the bucket. If the bottom plate of the container is opened suddenly in this state, ampules tend to be broken due to the rather large difference in height between the bottom of the container and that of the bucket. To prevent breakage of ampules, the bottom plate has to be opened slowly.

While the bottom plate is being opened slowly, the ampule collecting container cannot be raised to collect ampules for the next patient. A longer time is thus needed to collect ampules for all the patients.

If another transfer means is used to open the bottom plate slowly to put ampules into the bucket without breaking ampules, it is possible to raise the ampule collecting container quickly and thus to deliver ampules into buckets with high efficiency and without the possibility of breaking ampules.

An object of this invention is to provide an ampule delivery device which can deliver ampules from an ampule collecting container to a bucket quickly without breaking ampules delivered from the container into the bucket or those already in the bucket.

SUMMARY OF THE INVENTION

According to this invention, there is provided an ampule delivery device comprising an ampule container having a bottom plate that is movable between an open position and a closed position. The ampule container is vertically movable toward and away from a bucket being fed by a conveyor. Also, a locking means is provided for locking the bottom plate in the closed position so that ampules in the container are emptied into the bucket by unlocking the locking means to open the bottom plate when the container is lowered to its lowermost position, and raising the container to gradually let the bottom plate open wider.

With this arrangement, ampules in the ampule collecting device can be efficiently delivered into a bucket waiting under the collecting device without breaking ampules.

The ampule delivery device stands by at the uppermost position until ampules are fed thereinto. If an ampule collector is provided over the ampule delivery device, ampules are fed into the delivery device from the ampule collector. When the delivery device receives ampules, the entire delivery device begins to descend. When the delivery device has descended to the lower limit, the locking means unlocks the bottom plate.

Even though the bottom plate is unlocked, it can pivot only slightly downward because its edge touches the bottom of the bucket. Thus, the ampules in the container are still not discharged into the bucket. As the delivery device is raised slowly in this state, the bottom plate begins to open gradually wider, so that the ampules in the delivery device are completely transferred into the bucket by the time the delivery device is raised to its upper limit.

When the delivery device is raised to its upper limit, the locking means is activated to close the bottom plate to wait for the arrival of the next ampules. Ampules may be fed into the delivery device, not from the ampule collecting device, but from e.g. a conveyor.

Other features and objects of the present invention will become apparent from the following description made with reference to the accompanying drawings, in which:

DETAILED DESCRIPTION OF THE PREFERRED EMBODIMENT

Figure 1:
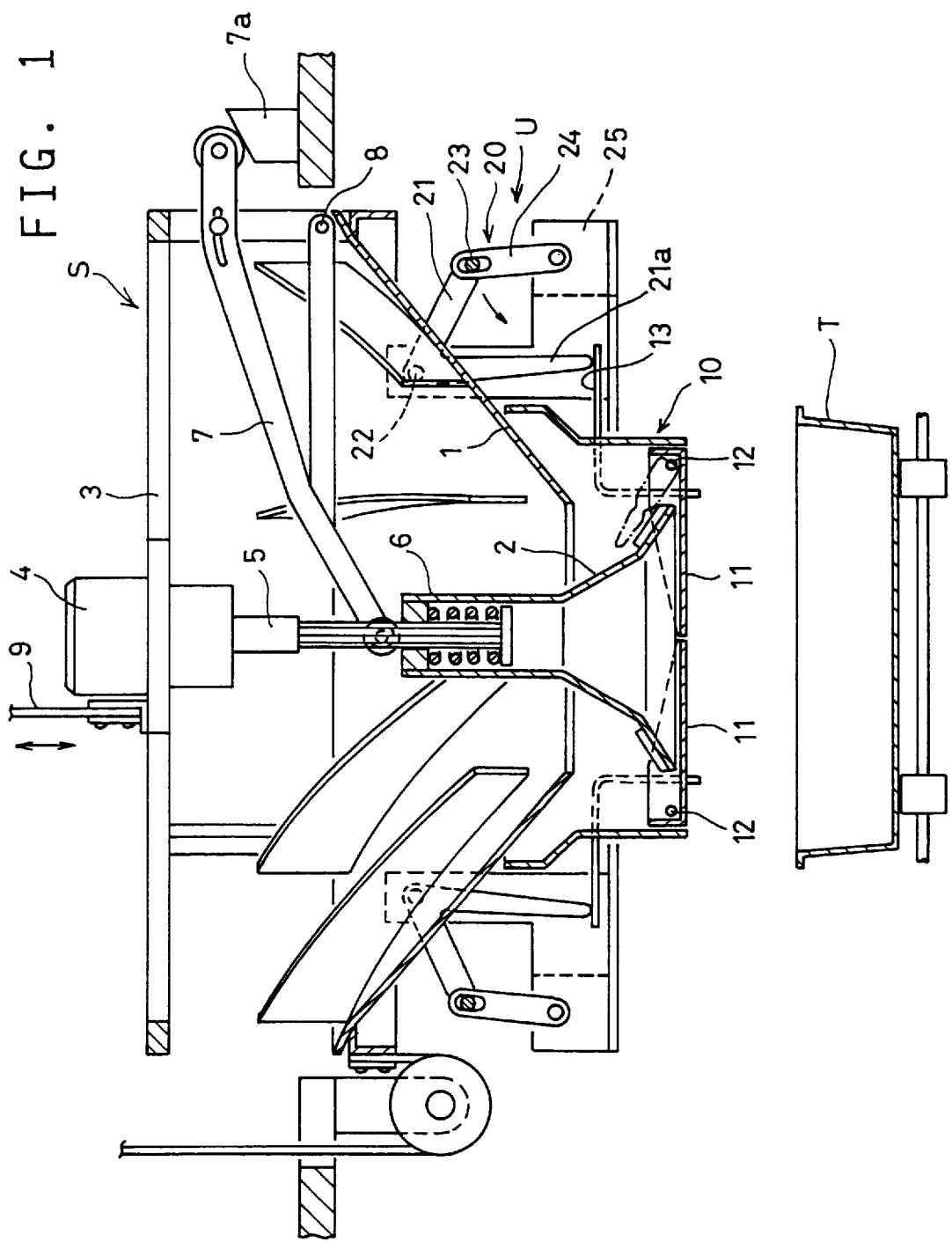
FIG. 1 is a partial sectional view of an ampule delivery device embodying this invention.

An embodiment of this invention is now described with reference to the drawings. FIG. 1 is a partial sectional view of an ampule delivery device embodying this invention. This device is adapted to deliver many ampules collected in a descending ampule container 1 into a bucket T fed horizontally on a conveyor provided under the collector S by opening bottom plates at the bottom of the device so as not to break any ampule.

An ampule collector S is provided over the ampule delivery device so as to be vertically movable together with a member provided over the container 1, and is adapted, in the position shown, to open a bottom cover 2 to discharge ampules in the container.

The ampule collector S comprises the conical ampule container 1, a frame 3 supporting a motor 4, and a bottom cover 2 provided coaxially with the container 1 at its bottom and having an integral base portion 6 connected to the output shaft of the motor 4 through a rod 5 so as to be rotated by the motor 4. The rod 5 has a splined shaft engaging the base portion 6 so as to be nonrotatable but vertically slidable relative to the base portion 6 and resiliently coupled to the base portion 6 through a spring mounted in the base portion 6.

Between the top end of the container 1 and the frame 3, a bifurcated arm 7 is provided so as to be pivotable about a pin 8 provided on a vertical portion of the frame 3. When the container 1 is lowered, the outer end of the arm 7 engages a stationary block 7a. The arm 7 thus pivots counterclockwise. The bottom cover 2 is thus pushed down by the inner end of the arm 7 to its open position. The entire container 1 is raised by a toothed belt 9 of an elevator means (not shown) in the direction of the arrow. When the container 1 is above its lowest position, the bottom cover 2 is rotated by the motor 4 to stir the ampules which were dispensed from an ampule feeder.

Figure 2:
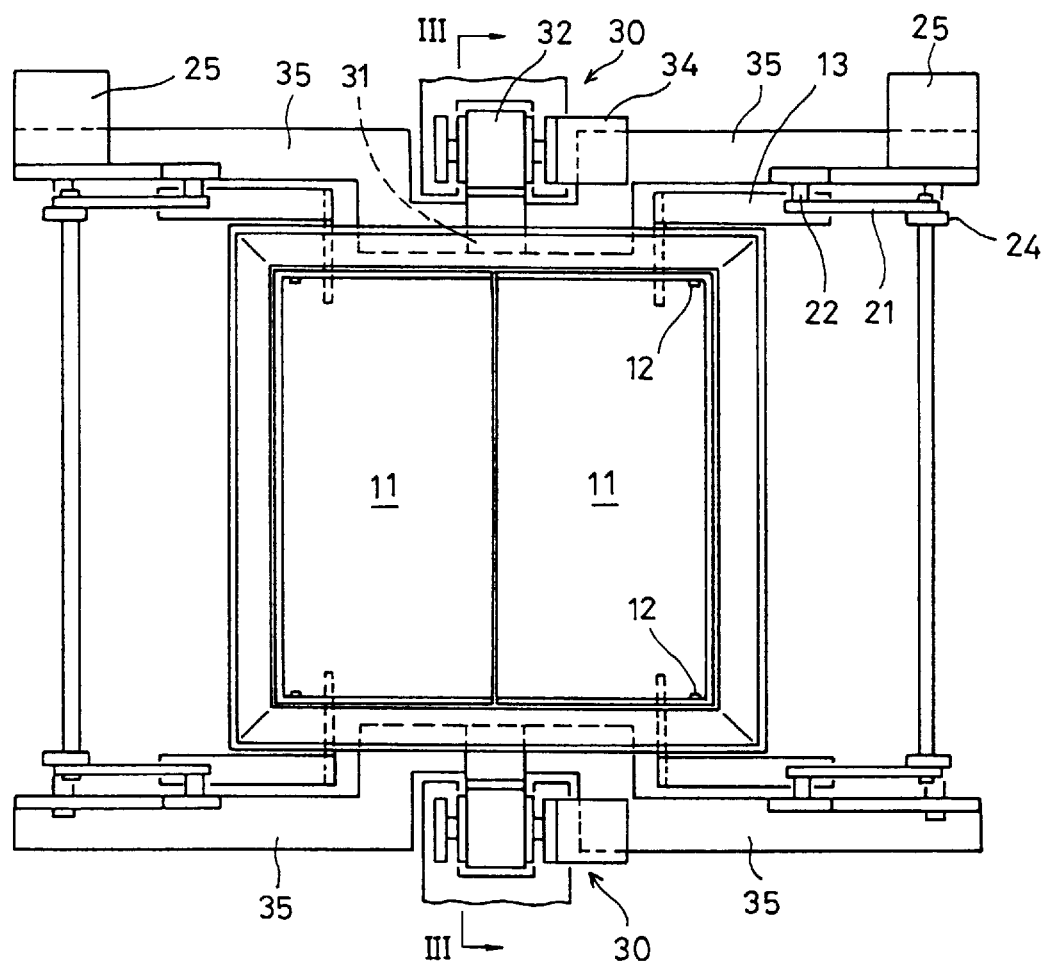
FIG. 2 is a plan view of the ampule delivery device of FIG. 1.
Figure 3:
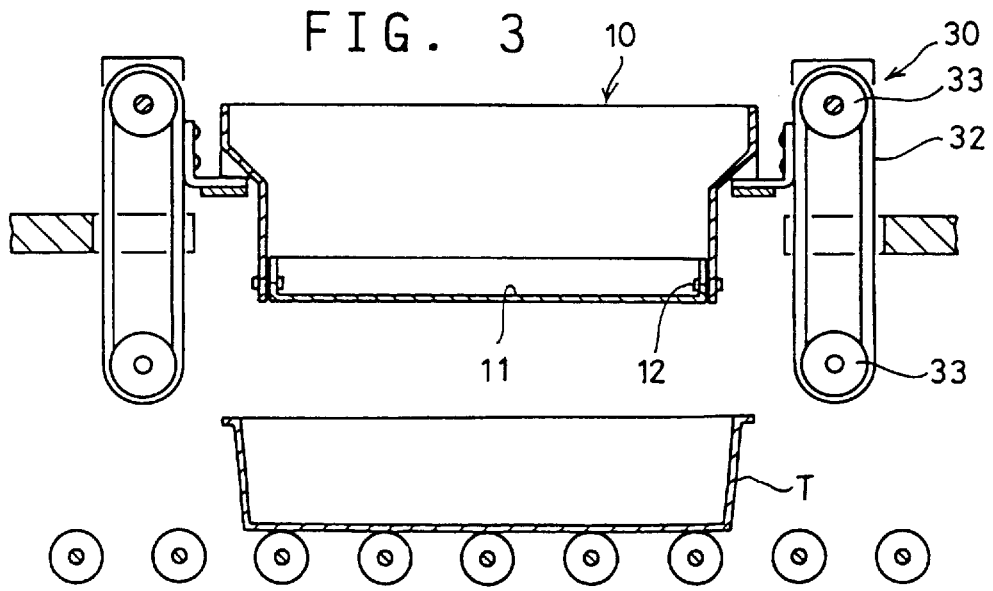
FIG. 3 is a sectional view taken along line III—III of FIG. 2.
Figure 4:
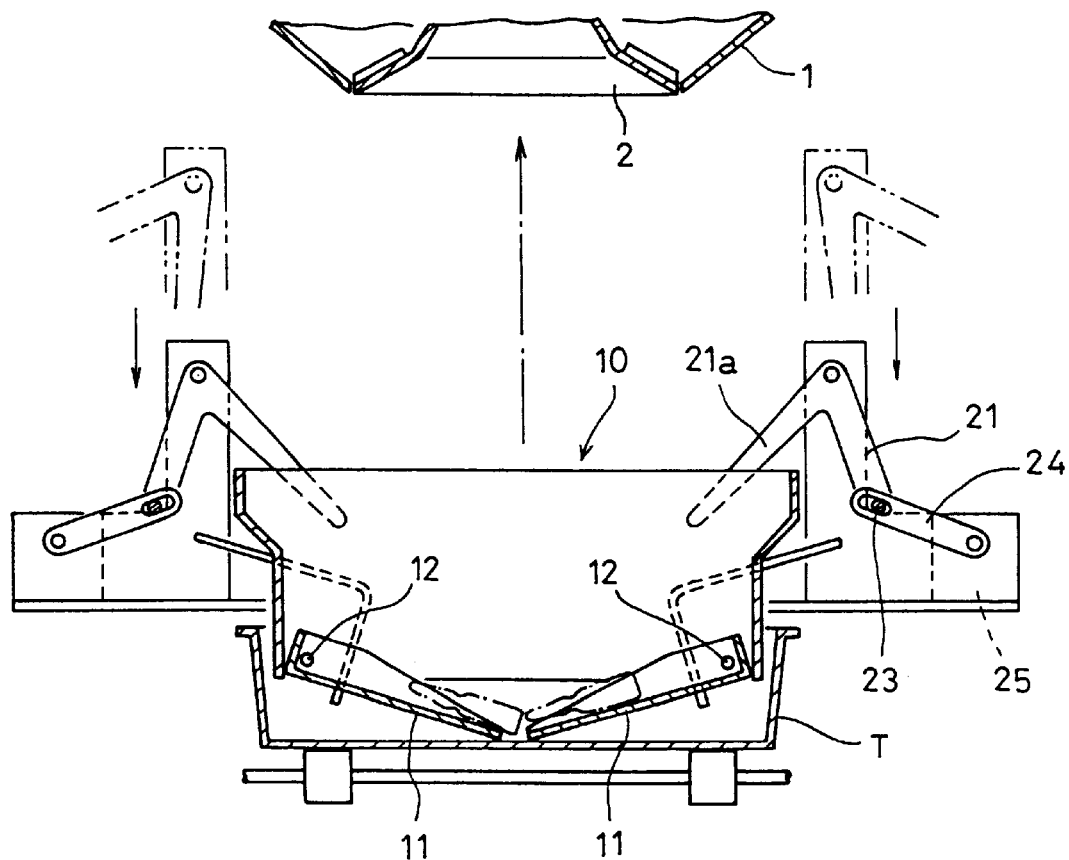
FIGS. 4 and 5 are views showing how the ampule delivery device operates.

The ampule delivery device U for receiving ampules discharged from the ampule collector S comprises an ampule delivery container 10, a locking means 20 and an elevator means 30 (FIG. 3). The ampule delivery container 10 comprises two flat-bottomed half closure members or bottom plates 11 and has a square cross-section as shown in FIG. 2. However, the container 10 it may have a circular cross-section. The bottom plates 11 are pivotable about shafts 12.

Outside the side plates of the container, L-shaped locking plates 13 are coupled to the shafts 12. When the bottom plates 11 are closed, the locking plates 13 are in contact with vertical portions 21a of bifurcated levers 21 of the locking means 20. Each bifurcated lever 21 is pivotable about a pin 22 and has one end thereof coupled to a lever 24 through a pin 23. The lever 24 is coupled to and pivoted by an output shaft of a rotary solenoid 25. To close the bottom plates 11, the levers 21 are pivoted so that their bottom portions 21a are erected upright to hold the locking plates 13 in a horizontal position, thereby locking the plates 11 in a horizontal closed position. To open the bottom plates 11, the lever 24 is pivoted in the direction of arrow to disengage the vertical portions 21a from the locking plates 13, thus unlocking the plates 11.

FIGS. 2 and 3 show the elevator means 30. As shown, it comprises two identical elevator assemblies provided on both sides of the container 10. Each assembly comprises a pair of pulleys 33, an endless belt 32 trained around the pulleys 33, an L-shaped support member 31 secured to the endless belt 32 for supporting a leg member 14 secured to the outer side of the container 10. One of the pulleys 33 of each assembly is coupled to the output shaft of a motor 34 to raise the container 10 by the motors 34. The motors 34 and the pulleys 33 are mounted on support arms 35 so as to be moved up and down together with the locking means 20. The assemblies on both sides of the container 10 are driven synchronously with each other by the respective motors 34.

The ampule delivery device U of this embodiment delivers ampules in the ampule collector S into a bucket T in the following manner. As shown in FIG. 1, the bottom cover 2 of the ampule collector S is lowered to its fully open position, i.e. the position in which its bottom touches the bottom plates 11.

If ampules remain in the container 10 when the bottom cover 2 is lowered to its fully open position, these ampules may be broken by the cover 2. Thus, the container 10 has to be emptied before the cover 2 is lowered to the fully open position. With this arrangement, since ampules in the container 1 are discharged into the empty container 10 by lowering the cover 2, there is no possibility of the cover 2 breaking any ampules. In contrast, if ampules in the container 1 were directly discharged into a bucket T by lowering the cover 2 until it touches the bottom of the bucket T, ampules already in the bucket T would be broken by the cover 2. This is why the delivery container 10 is used as an intermediate treatment member.

When ampules in the ampule collector S are discharged into the container 10, the latter is lowered by the elevator means 30 until the bottom plates 11 slightly sink into the tray T. In this state, care must be taken that the bottom plates 11 are not in contact with any ampules in the tray T. Then, the solenoids 25 of the locking means 20, which has been lowered together with the elevator means 30, are activated to pivot the bifurcated levers 21, thus disengaging its vertical portions 21a from the locking plates 13.

Figure 5:
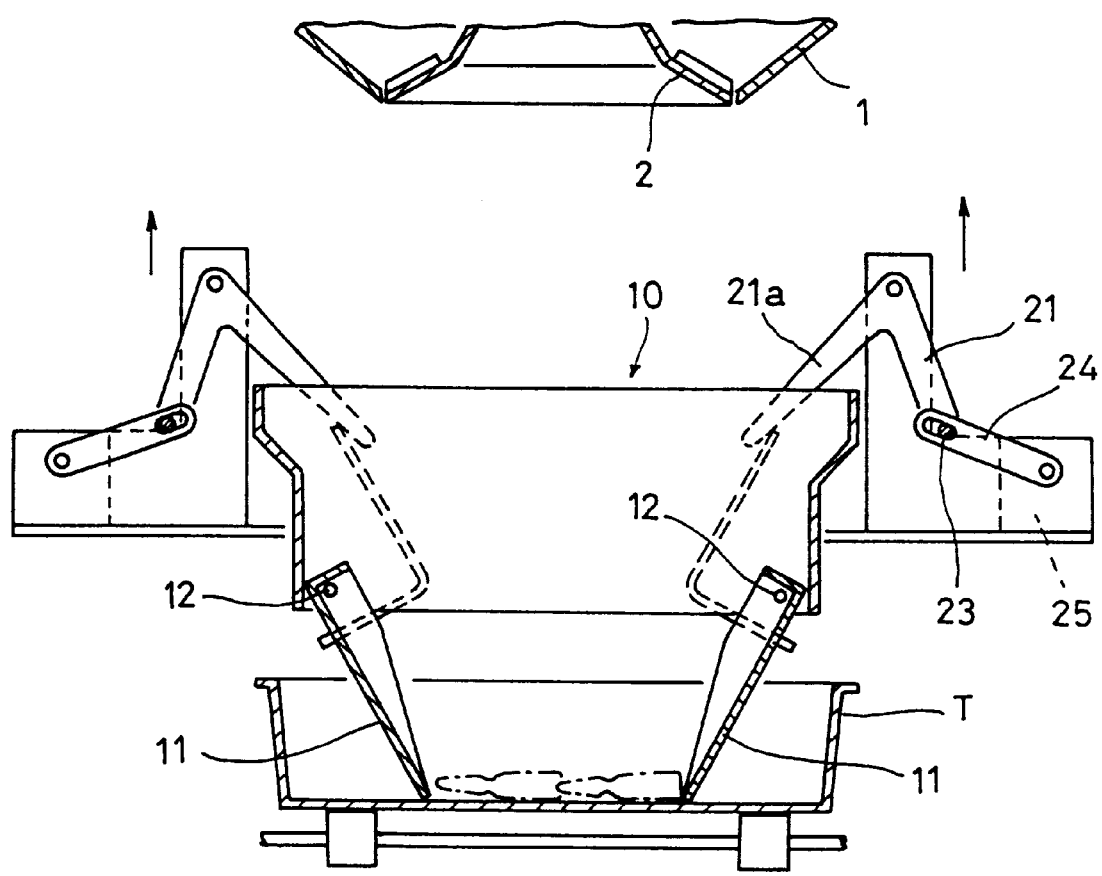

The bottom plates 11 are thus unlocked and pivot open by gravity until their ends touch the bottom of the bucket T. In this state, the container 10 is raised slowly by the elevator means 30 as shown in FIG. 5.

The bottom plates 11 thus open gradually wider as the container 10 rises, allowing the ampules in the container 10 to be softly laid on the bottom of the bucket T. By the time the container 10 is raised to its upper limit, all the ampules in the container 10 are emptied into the bucket T without being broken. The bucket is filled with ampules by repeating this operation.

In the embodiment, ampules collected in the ampule collector S are delivered into buckets. But the ampule delivery device according to this invention may be used to deliver ampules from any other means than the illustrated ampule collector. For example, ampules may be directly put into the ampule delivery unit from a conveyor belt so slowly that the ampules will not be broken. With this arrangement, ampules are arranged in an orderly manner by the conveyor belt before put into the delivery unit.

The ampule delivery device 10 of the embodiment has two separate bottom plates 2. But instead, a single bottom plate 11 which is opened to one side may be used.

The ampule delivery device according to this invention has a container having a bottom plate which can be selectively opened and closed, and an elevator means for moving the container up and down. The container is emptied before receiving a next lot of ampules from the ampule collector to prevent any ampules from being broken by the collector. Ampules will also never be broken when transferred from the ampule delivery device into a bucket, because ampules received in the delivery device are slowly delivered into the bucket by slowly raising the delivery device while opening the bottom plate gradually wider.

What is claimed is:

1. An ampule delivery device comprising:

an ampule container for storing ampules therein, said ampule container having at least one bottom plate which is movable under gravity from a first position, in which said bottom plate is closed, to a second position, in which said bottom plate is fully open;

a locking mechanism for selectively locking said bottom plate in said first position; and an elevator means for lowering said ampule container to a predetermined position with said bottom plate locked in said first position by said locking mechanism, and then upon operation of said locking mechanism to unlock said bottom plate, raising said ampule container to allow said bottom plate to move to said second position by gravity, thereby discharging the ampules.

2. An ampule delivery device as claimed in claim 1, wherein said locking mechanism comprises a linking structure including a pivotable lever, and a locking plate coupled to said bottom plate and pressed by one end of said pivotable lever to lock said bottom plate in said first position.

3. An ampule delivery device as claimed in claim 2, wherein said locking mechanism further comprises a rotary solenoid connected to said linking structure in order to move said one end of said pivotable lever into and out of contact with said locking plate.

4. An ampule delivery device as claimed in claim 3, wherein said bottom plate is pivotally connected to a lower portion of said ampule container, and said first position of said bottom plate is a horizontal closed position, and said bottom plate pivots from said first position downwardly toward said second position.

5. An ampule delivery device comprising:

an ampule container for storing ampules therein, said ampule container having a first bottom plate which can pivot under gravity from a first position, in which said first bottom plate is closed, to a second position, in which said first bottom plate is fully open;

a first locking mechanism for selectively locking said first bottom plate in said first position; and a first elevator assembly connected to said ampule container.

6. An ampule delivery device as claimed in claim 5, wherein said ampule container further comprises a second bottom plate which can pivot under gravity from a first position, in which said second bottom plate is closed, to a second position, in which said second bottom plate is fully open, said ampule delivery device further comprising:

a second locking mechanism for selectively locking said second bottom plate in said first position; and a second elevator assembly connected to an opposite side of said ampule container relative to said first elevator assembly.

7. An ampule delivery device as claimed in claim 6, wherein said first position of each of said first and second bottom plates is a horizontal closed position, and each of said first and second bottom plates pivots from said first position downwardly toward said second position.

8. An ampule delivery device as claimed in claim 6, wherein each of said first and second locking mechanisms comprise a linking structure including a pivotable lever, and a locking plate coupled to one of said first and second bottom plates and pressed by one end of said pivotable lever to lock said one bottom plate in said first position.

9. An ampule delivery device as claimed in claim 8, wherein each of said first and second locking mechanisms further comprises a rotary solenoid connected to said corresponding linking structure in order to move said one end of said pivotable lever into and out of contact with said locking plate.

* * * * *